(12) United States Patent
Ozaki et al.

(10) Patent No.: US 12,352,892 B2
(45) Date of Patent: *Jul. 8, 2025

(54) OPTICAL DISTANCE MEASURING DEVICE

(71) Applicant: DENSO CORPORATION, Kariya (JP)

(72) Inventors: Noriyuki Ozaki, Kariya (JP); Mitsuhiro Kiyono, Kariya (JP); Teiyu Kimura, Kariya (JP); Shinji Kashiwada, Kariya (JP)

(73) Assignee: DENSO CORPORATION, Kariya (JP)

( * ) Notice: Subject to any disclaimer, the term of this patent is extended or adjusted under 35 U.S.C. 154(b) by 826 days.

This patent is subject to a terminal disclaimer.

(21) Appl. No.: 17/169,238

(22) Filed: Feb. 5, 2021

(65) Prior Publication Data

US 2021/0181308 A1 Jun. 17, 2021

Related U.S. Application Data

(63) Continuation of application No. PCT/JP2019/030434, filed on Aug. 2, 2019.

(30) Foreign Application Priority Data

Aug. 9, 2018 (JP) .................. 2018-150303

(51) Int. Cl.
*G01S 7/481* (2006.01)
*G01C 3/06* (2006.01)
(Continued)

(52) U.S. Cl.
CPC ................ *G01S 7/481* (2013.01); *G01C 3/06* (2013.01); *G01J 1/44* (2013.01); *G01S 7/4808* (2013.01);
(Continued)

(58) Field of Classification Search
CPC .......... G01S 7/48; G01S 7/4808; G01S 7/481; G01S 7/4814; G01S 7/4815;
(Continued)

(56) References Cited

U.S. PATENT DOCUMENTS 6,400,448 B1 * 6/2002 Sugawara ............. G01S 7/4863
180/169
6,657,705 B2 * 12/2003 Sano ........................ G01S 17/46
180/167

(Continued)

FOREIGN PATENT DOCUMENTS

JP H07-191148 A 7/1995
JP 2004-157044 A 6/2004
(Continued)

*Primary Examiner* — Gordon J Stock, Jr.
(74) *Attorney, Agent, or Firm* — Maschoff Brennan

(57) ABSTRACT

An optical distance measuring device includes: a light source unit that irradiates a measurement region with irradiation light; a light receiving unit that has a light receiving surface including a plurality of light receiving elements capable of receiving reflected light from a range including the measurement region corresponding to irradiation with the irradiation light and outputs a signal corresponding to a light receiving state of the reflected light for each of the light receiving elements; and a measurement unit that measures a distance to an object in the measurement region by using the signal outputted from the light receiving unit. The light receiving unit has a function of selecting a light receiving element that outputs the signal so that a light receiving position at which the reflected light is received is variable, and the light receiving unit changes the light receiving position to a plurality of positions with respect to a position of the reflected light.

12 Claims, 13 Drawing Sheets

(51) Int. Cl.
*G01J 1/44* (2006.01)
*G01S 7/48* (2006.01)
*G01S 7/486* (2020.01)
*G01S 7/4861* (2020.01)
*G01S 7/4863* (2020.01)
*G01S 7/4865* (2020.01)
*G01S 17/08* (2006.01)
*G01S 17/89* (2020.01)

(52) U.S. Cl.
CPC ............ *G01S 7/4817* (2013.01); *G01S 7/486* (2013.01); *G01S 7/4861* (2013.01); *G01S 7/4863* (2013.01); *G01S 7/4865* (2013.01); *G01S 7/4868* (2013.01); *G01S 17/08* (2013.01); *G01S 17/89* (2013.01); *G01J 2001/4466* (2013.01)

(58) Field of Classification Search
CPC ...... G01S 7/4816; G01S 7/4817; G01S 7/483; G01S 7/484; G01S 7/486; G01S 7/4861; G01S 7/4863; G01S 7/4865; G01S 7/4868; G01S 17/02; G01S 17/04; G01S 17/06; G01S 17/08; G01S 17/42; G01S 17/50; G01S 17/58; G01S 17/66; G01S 17/74; G01S 17/89; G01J 2001/446; G01J 1/44; G01C 3/06
See application file for complete search history.

(56) References Cited

U.S. PATENT DOCUMENTS

| | | | | |
|---|---|---|---|---|
| 9,689,667 | B2* | 6/2017 | Royo Royo | G01B 11/22 |
| 10,324,171 | B2* | 6/2019 | Niclass | G01S 17/10 |
| 11,408,983 | B2* | 8/2022 | Kirillov | G01S 17/14 |
| 11,609,308 | B2* | 3/2023 | Ueno | G01S 7/4863 |
| 11,675,060 | B2* | 6/2023 | Mendel | G01S 7/4815 |
| | | | | 356/5.01 |
| 11,686,843 | B2* | 6/2023 | Ueno | G01C 3/08 |
| | | | | 356/5.01 |
| 11,725,933 | B2* | 8/2023 | Wang | G06T 7/521 |
| 2015/0285625 | A1 | 10/2015 | Deane | |
| 2017/0176579 | A1 | 6/2017 | Niclass et al. | |
| 2017/0366737 | A1 | 12/2017 | Yang et al. | |
| 2018/0231660 | A1 | 8/2018 | Deane | |
| 2018/0275310 | A1* | 9/2018 | Hörsch | G01S 17/48 |
| 2018/0341020 | A1* | 11/2018 | Magee | G01S 17/42 |
| 2019/0064327 | A1* | 2/2019 | Ichiyanagi | G01S 17/42 |
| 2019/0277970 | A1 | 9/2019 | Deane | |
| 2020/0081097 | A1* | 3/2020 | Abe | G01S 7/4863 |

FOREIGN PATENT DOCUMENTS

| | | |
|---|---|---|
| JP | 2010-91377 A | 4/2010 |
| JP | 2015-078953 A | 4/2015 |
| WO | 2017/180277 A1 | 10/2017 |
| WO | WO-2019176583 A1 * | 9/2019 ............ G01S 17/10 |

* cited by examiner

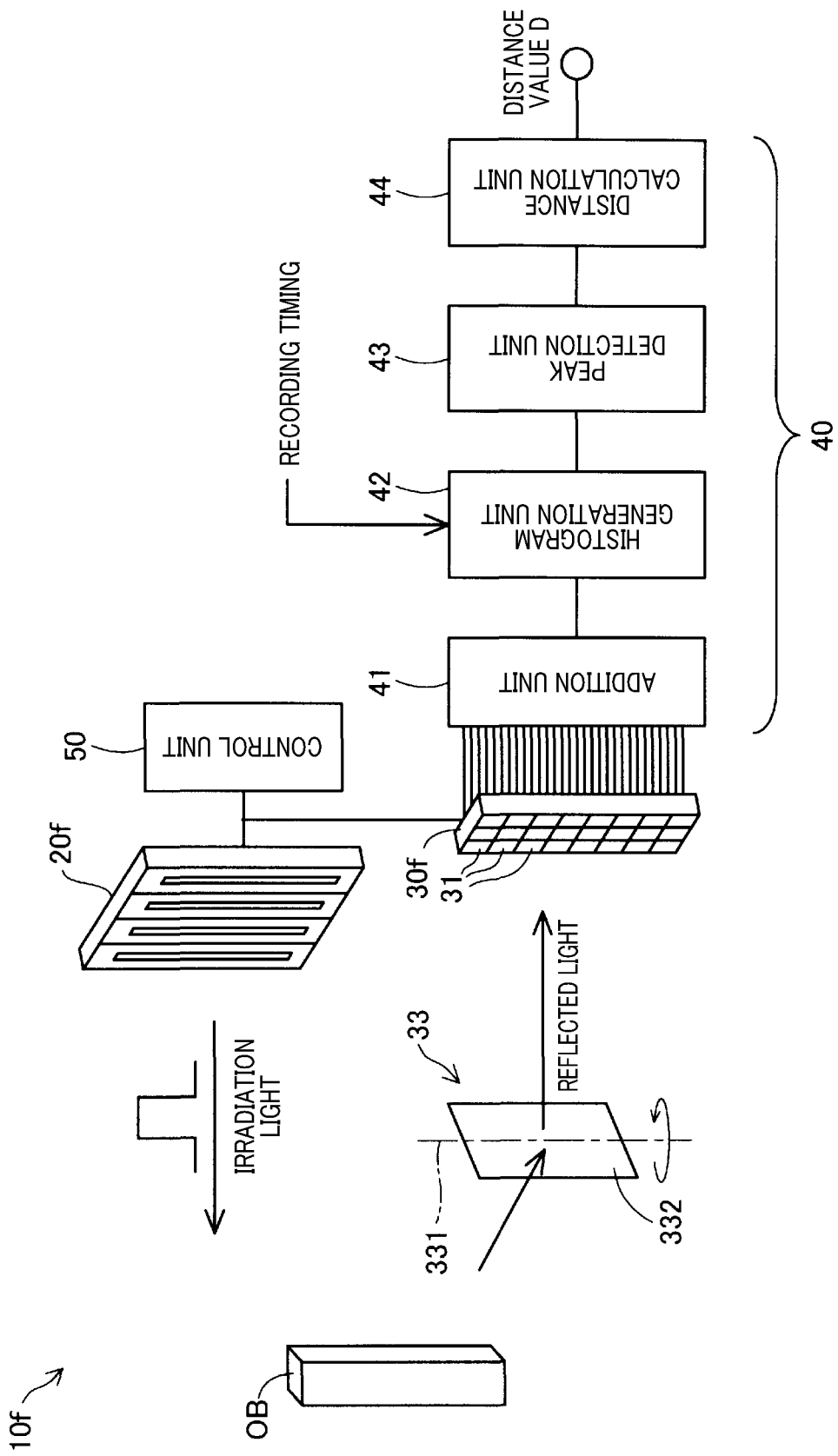

OPTICAL DISTANCE MEASURING DEVICE

CROSS-REFERENCE TO RELATED APPLICATION

This application is the U.S. bypass application of International Application No. PCT/JP2019/030434 filed on Aug. 2, 2019 which designated the U.S. and claims priority to Japanese Patent Application No. 2018-150303 filed on Aug. 9, 2018, the contents of both of which are incorporated herein by reference.

TECHNICAL FIELD

The present disclosure relates to an optical distance measuring device.

BACKGROUND

With regard to an optical distance measuring device, for example, JP 2015-78953 A describes a radar device in which reflected light of a laser beam emitted from a light source is detected on a light receiving surface on which a plurality of pixels are arranged in a two-dimensional matrix. The laser beam irradiation surface irradiated with the laser beam is formed in a rectangular shape, and a range of the light receiving surface irradiated with the reflected light also has a rectangular shape. This device prohibits operation of the pixels outside the light receiving range of the light receiving surface, thereby reducing the influence of erroneous detection of light.

SUMMARY

A first aspect of the present disclosure provides an optical distance measuring device. The optical distance measuring device includes: a light source unit that irradiates a measurement region with irradiation light; a light receiving unit that has a light receiving surface including a plurality of light receiving elements capable of receiving reflected light from a range including the measurement region corresponding to irradiation with the irradiation light and outputs a signal corresponding to a light receiving state of the reflected light for each of the light receiving elements; and a measurement unit that measures a distance to an object in the measurement region by using the signal outputted from the light receiving unit. The light receiving unit has a function of selecting a light receiving element that outputs the signal so that a light receiving position at which the reflected light is received is variable, and the light receiving unit changes the light receiving position to a plurality of positions with respect to a position of the reflected light.

A second aspect of the present disclosure provides an optical distance measuring device. The optical distance measuring device includes: a light receiving unit that has a light receiving surface including a plurality of light receiving elements capable of receiving reflected light from a measurement region and outputs a signal corresponding to a light receiving state of the reflected light for each of the light receiving elements; a light source unit that irradiates the measurement region with irradiation light while changing an irradiation azimuth so that the reflected light is moved on the light receiving surface, the irradiation azimuth being an azimuth in which the measurement region is irradiated with the irradiation light; and a measurement unit that measures a distance to an object in the measurement region by using the signal outputted from the light receiving unit. The light receiving unit receives the reflected light while moving a light receiving position toward a predetermined direction and the light receiving position is a position of a light receiving element that receives the reflected light, and the light source unit changes the irradiation azimuth to a plurality of azimuths for each single light receiving position at which the reflected light is received.

BRIEF DESCRIPTION OF THE DRAWINGS

The above features of the present disclosure will be made clearer by the following detailed description, given referring to the appended drawings. In the accompanying drawings:

FIG. 14 is a diagram showing a configuration of an optical distance measuring device according to a sixth embodiment.

DETAILED DESCRIPTION OF THE PREFERRED EMBODIMENTS

Figure 1:
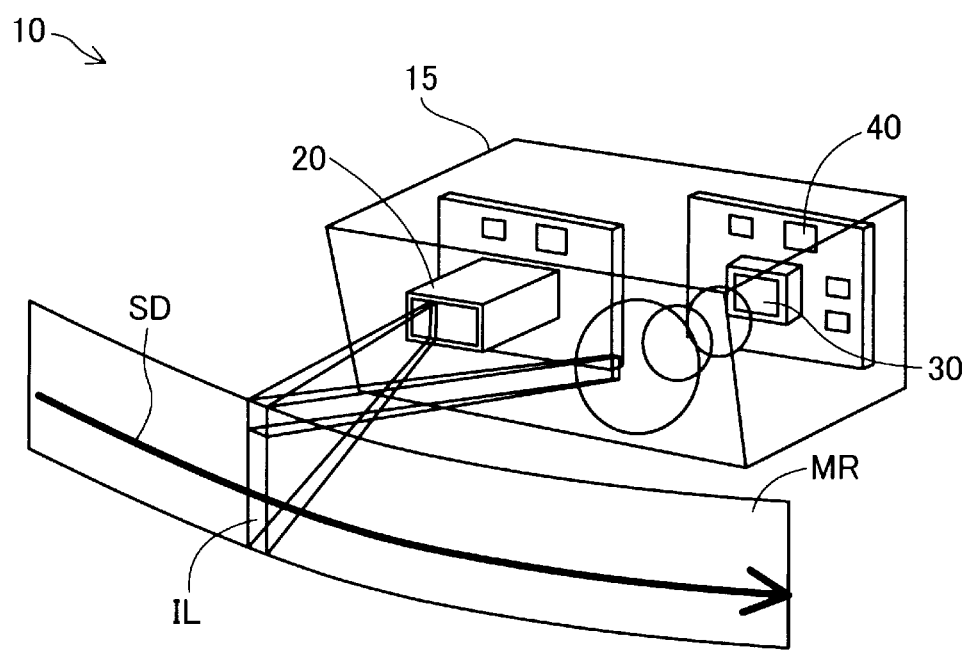
FIG. 1 is a diagram showing a schematic configuration of an optical distance measuring device.

In the optical distance measuring device described in JP 2015-78953 A, due to temperature characteristics of a lens, a holder, an adhesive, and the like used in the optical distance measuring device, there is a possibility that a light receiving position for the reflected light on the light receiving surface may change according to the surrounding temperature. In such a case, the reflected light may not be able to be appropriately received in the light receiving range, resulting in deterioration in distance measurement performance.

The present disclosure can be implemented as the following aspects.

A first aspect of the present disclosure provides an optical distance measuring device. The optical distance measuring device includes: a light source unit that irradiates a measurement region with irradiation light; a light receiving unit that has a light receiving surface including a plurality of light receiving elements capable of receiving reflected light from a range including the measurement region corresponding to irradiation with the irradiation light and outputs a signal corresponding to a light receiving state of the reflected light for each of the light receiving elements; and a measurement unit that measures a distance to an object in the measurement region by using the signal outputted from the light receiving unit. The light receiving unit has a function of selecting a light receiving element that outputs the signal so that a light receiving position at which the reflected light is received is variable, and the light receiving unit changes the light receiving position to a plurality of positions with respect to a position of the reflected light.

According to the optical distance measuring device of the first aspect, the light receiving position for the reflected light in the light receiving unit is changed to the plurality of positions, and accordingly, the reflected light is more likely to be appropriately received. Thus, when the light receiving position for the reflected light on the light receiving surface is changed according to the surrounding temperature, the distance measurement performance is less likely to be deteriorated.

A second aspect of the present disclosure provides an optical distance measuring device. The optical distance measuring device includes: a light receiving unit that has a light receiving surface including a plurality of light receiving elements capable of receiving reflected light from a measurement region and outputs a signal corresponding to a light receiving state of the reflected light for each of the light receiving elements; a light source unit that irradiates the measurement region with irradiation light while changing an irradiation azimuth so that the reflected light is moved on the light receiving surface, the irradiation azimuth being an azimuth in which the measurement region is irradiated with the irradiation light; and a measurement unit that measures a distance to an object in the measurement region by using the signal outputted from the light receiving unit. The light receiving unit receives the reflected light while moving a light receiving position toward a predetermined direction and the light receiving position is a position of a light receiving element that receives the reflected light, and the light source unit changes the irradiation azimuth to a plurality of azimuths for each single light receiving position at which the reflected light is received.

According to the optical distance measuring device of the second aspect, the azimuth in which the measurement region is irradiated with the irradiation light for each single light receiving position at which the reflected light is received is changed to the plurality of azimuths, and accordingly, the reflected light is more likely to be appropriately received. Thus, when the light receiving position for the reflected light on the light receiving surface is changed according to the surrounding temperature, the distance measurement performance is less likely to be deteriorated.

The present disclosure can also be implemented in various forms other than the optical distance measuring device. For example, the present disclosure can be implemented in forms such as an optical distance measuring method, a vehicle equipped with the optical distance measuring device, and a control method of controlling the optical distance measuring device.

Embodiment according to an optical distance measuring device will be described with reference to FIG. 1 to FIG. 14.

A. First Embodiment

As shown in FIG. 1, an optical distance measuring device 10 as a first embodiment of the present disclosure includes a housing 15, a light source unit 20, a light receiving unit 30, and a measurement unit 40. The light source unit 20 and the light receiving unit 30 are fixed to the housing 15, for example, with an adhesive. The light source unit 20 emits irradiation light IL to a measurement region MR. In the present embodiment, the light source unit 20 scans the irradiation light IL in a scanning direction SD. The irradiation light IL forms a rectangular shape whose longitudinal direction is a direction orthogonal to the scanning direction SD. The light receiving unit 30 receives reflected light from a range including the measurement region MR corresponding to irradiation with the irradiation light IL, and outputs a signal corresponding to a light receiving state of the reflected light. By using the signal outputted from the light receiving unit 30, the measurement unit 40 measures a distance to an object that is present in the measurement region MR. The optical distance measuring device 10 is, for example, mounted on a vehicle and used to detect an obstacle and measure a distance to the obstacle.

Figure 2:
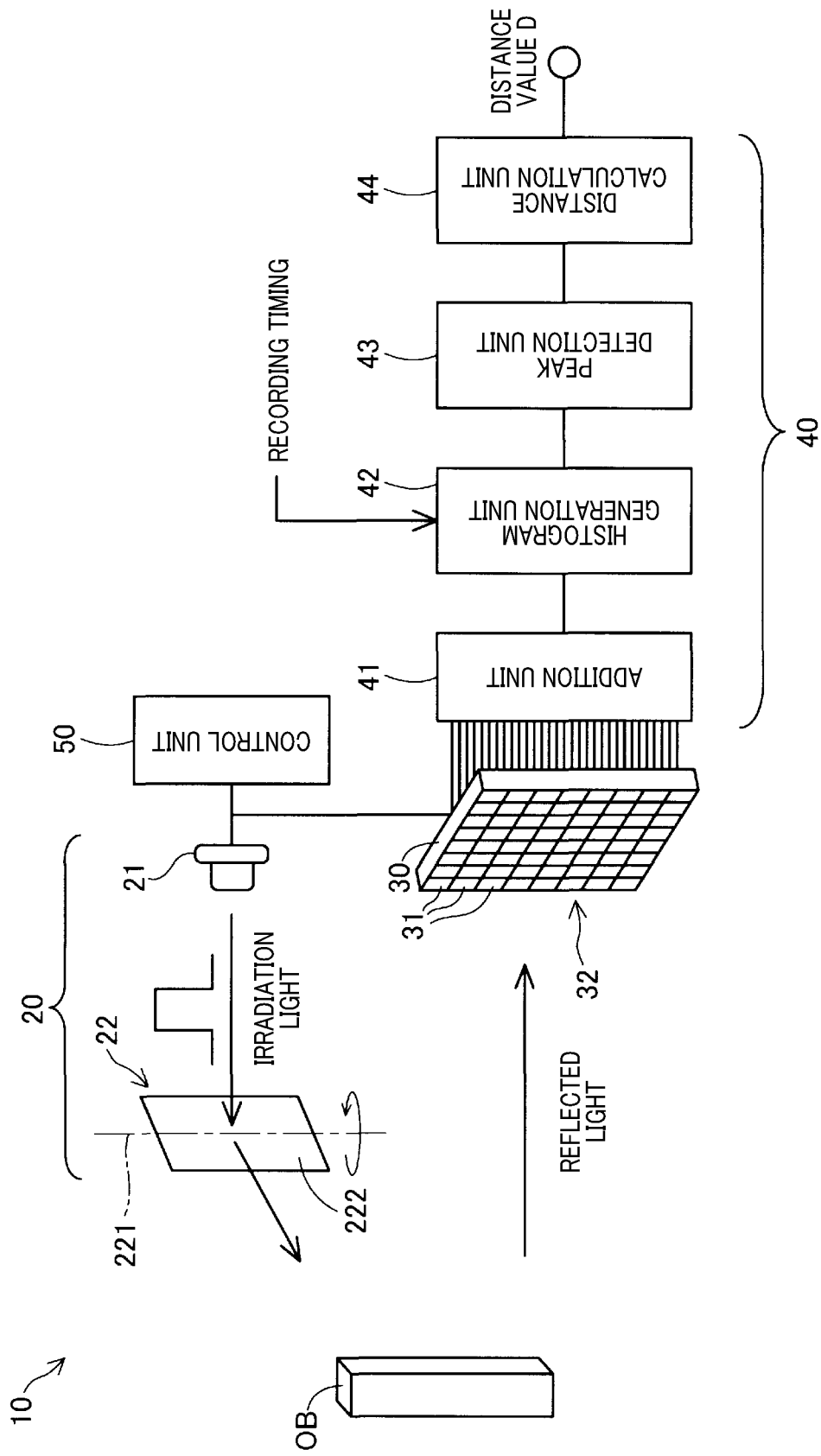
FIG. 2 is a diagram showing a configuration of the optical distance measuring device.

FIG. 2 shows a more specific configuration of the optical distance measuring device 10. As shown in FIG. 2, in addition to the light source unit 20, the light receiving unit 30, and the measurement unit 40 shown in FIG. 1, the optical distance measuring device 10 includes a control unit 50. The control unit 50 is configured as a computer including a CPU and a memory, and controls the light source unit 20 and the light receiving unit 30.

The light source unit 20 includes a laser light source 21 and a first scanning unit 22. The laser light source 21 is composed of a semiconductor laser diode, and emits a pulse laser beam as irradiation light. The irradiation light emitted from the laser light source 21 is formed into the vertical irradiation light IL as shown in FIG. 1 by an optical system (not shown). The first scanning unit 22 rotates a mirror 222 around a rotation axis 221 to perform a one-dimensional scanning of the irradiation light IL over the measurement region MR. The mirror 222 is composed of, for example, a MEMS mirror. The rotation of the mirror 222 is controlled by the control unit 50. The first scanning unit 22 performs a one-dimensional scanning of the irradiation light IL, and thus, the light source unit 20 irradiates the measurement region MR with the irradiation light IL while changing an azimuth in which the measurement region MR is irradiated with the irradiation light IL. In the present embodiment, a light source of the light source unit 20 is a laser diode element 18, but another light source such as a solid-state laser may be used.

Irradiation light emitted from the light source unit 20 is reflected by an object OB in the measurement region MR. The reflected light reflected by the object OB is received by the light receiving unit 30. In the present embodiment, the light receiving unit 30 receives the reflected light through a light receiving lens configured so that the size of the reflected light on the light receiving surface 32 is smaller than the size of the light receiving surface 32. Apart (e.g., apart at an end in the longitudinal direction) of the reflected light may be received by the light receiving unit 30 so as to protrude from the light receiving surface 32.

Figure 3:
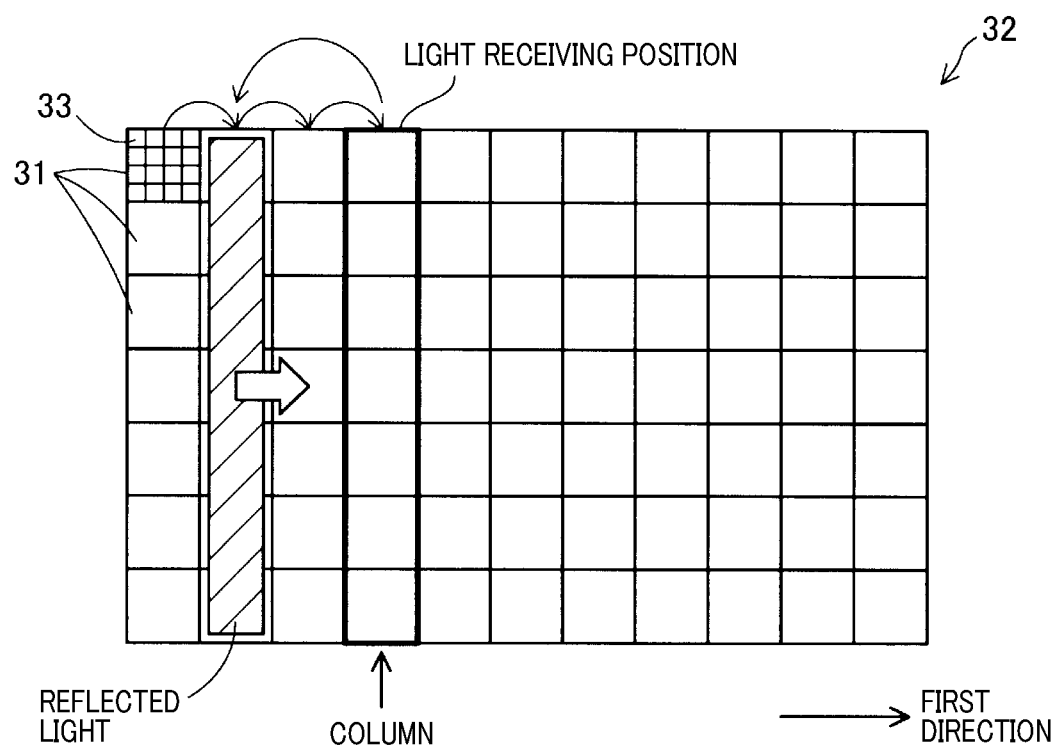
FIG. 3 is a diagram showing a relationship between a position of reflected light and a light receiving position on a light receiving surface.

As shown in FIGS. 2 and 3, the light receiving unit 30 includes a plurality of pixels 31 that are two-dimensionally arranged on the light receiving surface 32 that is irradiated with the reflected light. The pixel 31 is also referred to as "light receiving element". The pixel 31 includes a plurality of light receiving devices capable of outputting a signal according to incidence of the reflected light from the object OB. In the present embodiment, the pixel 31 includes a SPAD (single photon avalanche diode) as the light receiving device. The pixel 31 includes, for example, 4 SPADs wide by 4 SPADs high, i.e., 16 SPADs in total. The light receiving surface 32 of the light receiving unit 30 is configured, for example, such that 64 pixels 31 are arranged in the longitudinal direction and 256 pixels 31 are arranged in the lateral direction. When light (photon) is inputted into the SPAD, with a certain probability, the SPAD outputs a pulse output signal indicating incidence of light. Thus, the pixel 31 outputs 0 to 16 pulse signals according to the intensity of the received light.

The light receiving unit 30 has a function of selecting a light receiving element that outputs a signal so that a light receiving position at which the reflected light is received is variable. Specifically, the light receiving unit 30 turns pixels 31 ON (active) in a column specified by the control unit 50, and uses the active pixels 31 to receive the reflected light. In other words, the light receiving unit 30 turns the pixels 31 OFF (inactive) in the columns other than the column specified by the control unit 50, and no reflected light is received by the inactive pixels 31. The column of pixels 31 specified for light reception by the control unit 50 is referred to as "light receiving position". Instead of turning ON/OFF the pixels 31 so that the light receiving position is variable, for example, the measurement unit 40 (described later) may select, from the signals outputted from the light receiving unit 30, a signal to be used for distance measurement so that the light receiving position in the light receiving unit 30 is substantially variable.

In the present embodiment, as shown in FIG. 3, due to a scanning of the irradiation light IL in the scanning direction SD by the first scanning unit 22, the vertical reflected light is moved in a predetermined direction on the light receiving surface 32. The direction in which the reflected light is moved is hereinafter referred to as "first direction". The fact that the reflected light is moved in the first direction indicates that the light source unit 20 irradiates the measurement region MR with the irradiation light IL while changing an azimuth in which the measurement region MR is irradiated with the irradiation light IL among a plurality of azimuths so that the reflected light is moved toward the first direction on the light receiving surface 32. The "plurality of azimuths" refers to azimuths of the irradiation light IL corresponding to the light receiving positions on the light receiving surface 32.

In the present embodiment, the light receiving unit 30 changes, to a plurality of positions in the first direction, the light receiving position at which the reflected light is received depending on the azimuth in which the measurement region MR is irradiated with the irradiation light IL. Specifically, the control unit 50 controls ON/OFF of the pixels 31 of the light receiving unit 30 to change the light receiving position so that while the reflected light is moved by a single column of pixels in the first direction, the light receiving position is moved forward column by column by three columns of pixels toward the first direction and then moved backward by two columns of pixels. That is, in the present embodiment, the light receiving unit 30 changes the light receiving position to a plurality of positions by moving the light receiving position toward the first direction. Furthermore, in the present embodiment, the light receiving unit 30 moves the light receiving position at a speed higher than a speed at which the reflected light is moved on the light receiving surface 32. Furthermore, in the present embodiment, every time a light receiving process is completed for irradiation with the irradiation light IL in a single azimuth, the light receiving unit 30 moves the light receiving position in a direction opposite to the first direction. The light receiving process is a process of changing the light receiving position to a plurality of positions in order to receive the irradiation light IL from a single azimuth. Furthermore, in the present embodiment, when the light receiving process is completed, the light receiving unit 30 moves the light receiving position in the direction opposite to the first direction to move the light receiving position back to a position (position adjacent on the right to the left end in FIG. 3) closer to the first direction side than the light receiving position (position at the left end in FIG. 3) was when irradiation with the irradiation light in the previous azimuth is started. The change in the light receiving position in this manner is hereinafter referred to as "reciprocating movement" of the light receiving position. According to instructions from the control unit 50, the light receiving unit 30 repeatedly performs a reciprocating movement of the light receiving position for each of the plurality of azimuths in which the measurement region MR is irradiated with the irradiation light IL. When the light receiving position is moved back and forth in this manner, the light receiving position can be changed to a plurality of positions according to the movement of the reflected light; thus, the reflected light is more likely to be received. The amount of movement (three columns of pixels) by which the light receiving position is moved in the first direction and the amount of movement (two columns of pixels) by which the light receiving position is moved backward in the direction opposite to the first direction are not limited to the amounts described above and may be set as appropriate.

Figure 4:
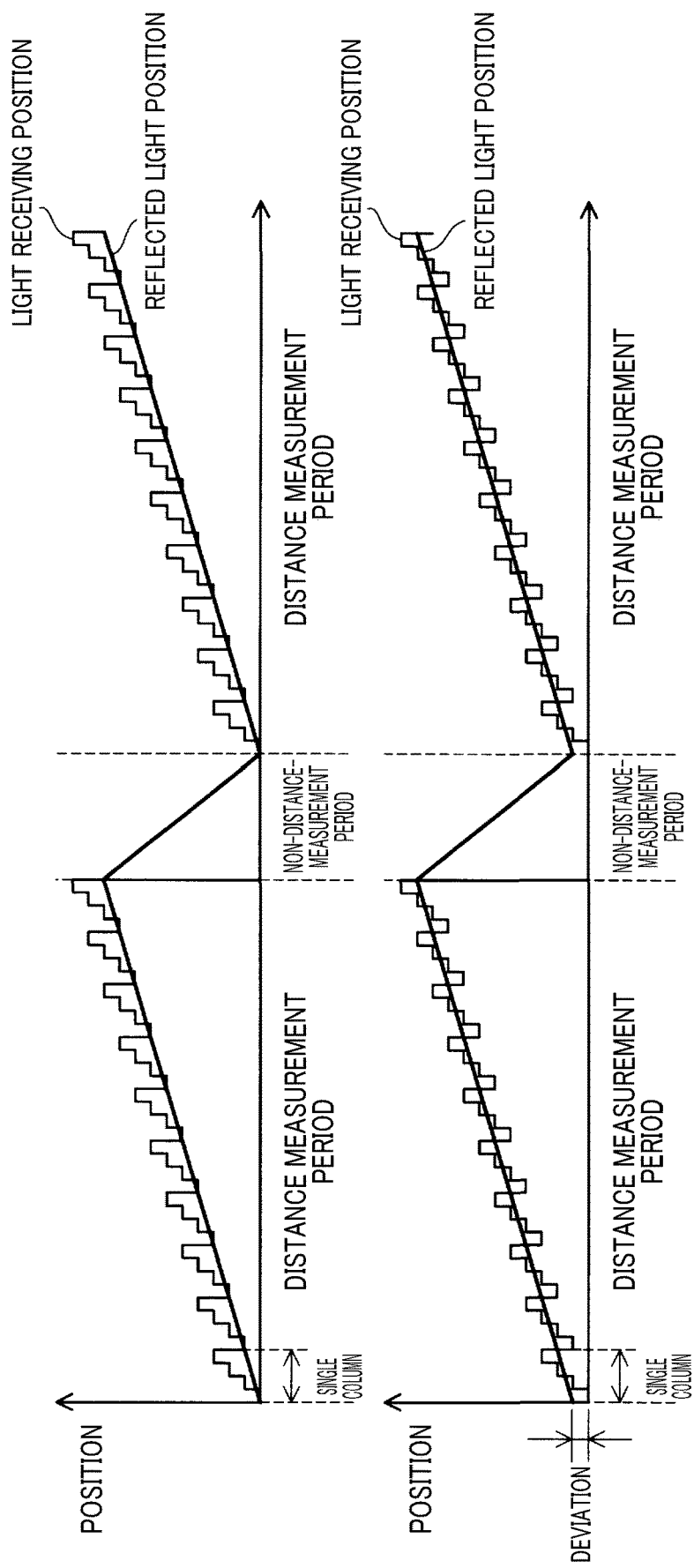
FIG. 4 is a diagram showing a relationship between the position of the reflected light and the light receiving position.

FIG. 4 shows a graph of a relationship between the position of the reflected light and the light receiving position on the light receiving surface 32. In the graph shown in FIG. 4, the horizontal axis represents a time at which distance measurement is performed by the measurement unit 40, and the vertical axis represents the position of the reflected light and the light receiving position on the light receiving surface 32. In order to measure the distance for a single frame indicating the entire measurement region MR, the measurement unit 40, which will be described later in detail, performs distance measurement during a "distance measurement period" while the light receiving position and the azimuth of the irradiation light IL are changed. Then, during a "non-distance-measurement period", the light receiving position and the azimuth of the irradiation light IL are moved back to the initial positions. That is, after the distance measurement for the "plurality of azimuths" described above is completed by the measurement unit 40, during the non-distance-measurement period which is a period in which no distance measurement is performed, the light receiving unit 30 moves the light receiving position back to the initial position.

Figure 5:
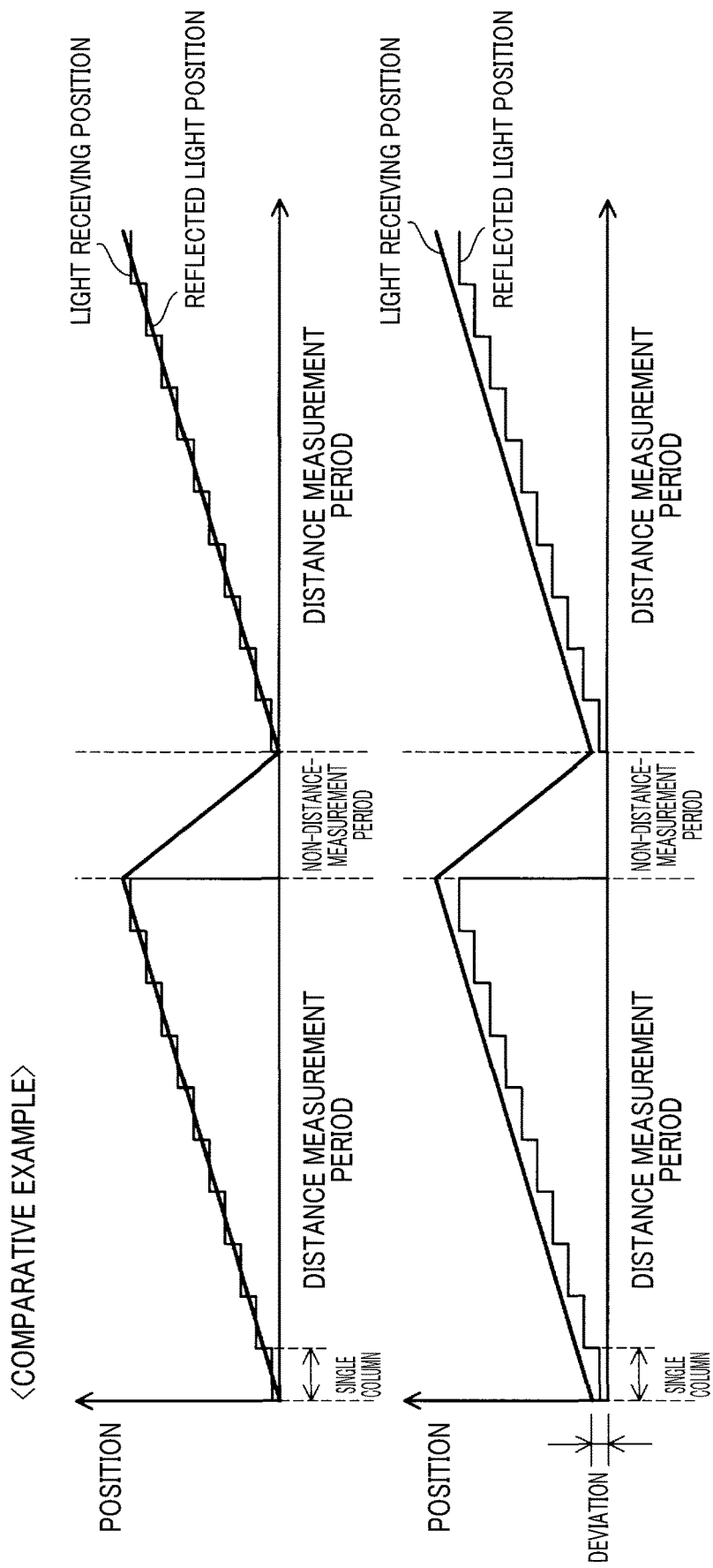
FIG. 5 is a diagram showing a comparative example of the relationship between the position of the reflected light and the light receiving position.

As shown in FIG. 4, in the present embodiment, during the distance measurement period, while the position of the reflected light is linearly changed with time, the light receiving position is moved back and forth by being moved forward and backward in the first direction on the light receiving surface 32 to be gradually moved toward the first direction. In FIG. 4, a position at which a polygonal line representing the position of the reflected light intersects a polygonal line representing the light receiving position indicates the light receiving position at which the reflected light is received. In the present embodiment, the light receiving position is moved back and forth; thus, not only when the reflected light is received at a normal position as shown in the upper portion in FIG. 4, but also when a position on the light receiving surface 32 irradiated with the reflected light is deviated from the normal position as shown in the lower portion in FIG. 4, the reflected light can be appropriately received at any of the positions between which the light receiving position is moved back and forth. On the other hand, as shown in FIG. 5, if the light receiving position is not moved back and forth, when a position on the light receiving surface 32 irradiated with the reflected light is deviated from the normal position as shown in the lower portion in FIG. 5, there is a possibility that the position irradiated with the reflected light does not match the light receiving position and the reflected light cannot be appropriately received.

Next, the measurement unit 40 shown in FIG. 2 will be described. The measurement unit 40 includes an addition unit 41, a histogram generation unit 42, a peak detection unit 43, and a distance calculation unit 44. These units are configured as, for example, one or more integrated circuits. The units may be functional units that are implemented by software through execution of a program by a CPU.

The addition unit 41 is a circuit that adds up, for each of the pixels 31 included in the light receiving position, the number of pulse signals outputted from the pixel 31 to obtain an addition value. More specifically, the addition unit 41 obtains an addition value for each of the pixels 31 by counting the number of pulse signals outputted substantially at the same time from the plurality of SPADs included in the pixel 31. In the present embodiment, as shown in FIG. 3, every time the reflected light is moved by a single pixel in the first direction on the light receiving surface 32, the light receiving position is moved by three pixels in the first direction. Thus, the addition unit 41 adds up addition values for the three pixels by which the light receiving position is moved, and outputs the obtained value.

Figure 6:
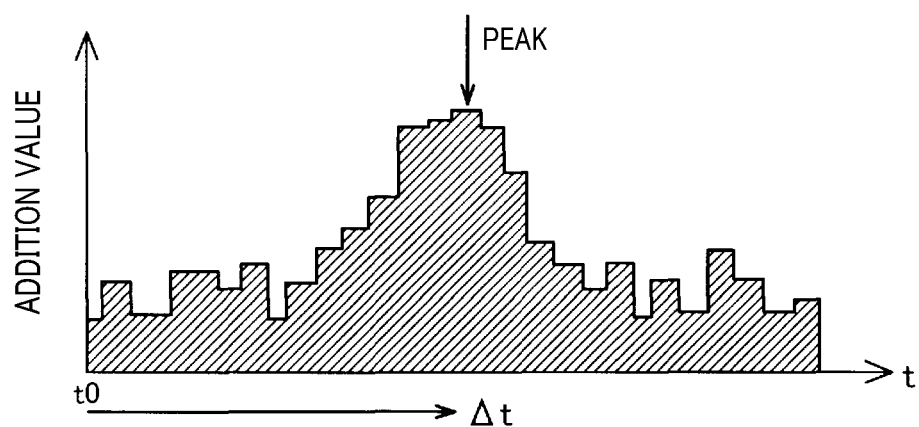
FIG. 6 is a diagram showing an example of a histogram.

The histogram generation unit 42 is a circuit that generates a histogram for each of the pixels 31 on the basis of the addition value outputted from the addition unit 41. FIG. 6 shows an example of the histogram. The class (horizontal axis) of the histogram represents time of flight of light from emission of the irradiation light IL to reception of the reflected light by the pixel 31. Hereinafter, the time is referred to as TOF (Time Of Flight). On the other hand, the frequency (vertical axis) of the histogram represents the addition value calculated by the addition unit 41, and indicates the intensity of light reflected by the object OB. The histogram generation unit 42 generates a histogram by recording the addition value outputted from the addition unit 41 for each TOF according to a predetermined recording timing signal. When the object OB is present in the measurement region MR, light is reflected by the object OB, and the addition value is recorded in the class of TOF corresponding to the distance to the object OB.

The peak detection unit 43 is a circuit that detects a peak in the histogram. The peak detection unit 43 determines, as the peak, a part of the histogram with the highest frequency. The peak in the histogram indicates that the object OB is present at a position (distance) corresponding to TOF at the peak.

The distance calculation unit 44 is a circuit that obtains a distance value D from TOF corresponding to the peak detected by the peak detection unit 43. The distance calculation unit 44 calculates the distance value D by the following equation (1), where "$\Delta t$" represents TOF corresponding to the peak, "c" represents the speed of light, and "D" represents the distance value. The distance calculation unit 44 calculates the distance value D for all the histograms, i.e., for all the pixels 31.

$$D = (c \times \Delta t)/2 \qquad \text{Equation (1)}$$

The distance value D measured by the measurement unit 40 is outputted from the optical distance measuring device 10 to an ECU of the vehicle or the like. The ECU of the vehicle can detect an obstacle in the measurement region MR and measure a distance to the obstacle by using the distance value for each of the pixels 31 that is acquired from the optical distance measuring device 10.

According to the optical distance measuring device 10 of the present embodiment described above, even when the positions at which the light source unit 20 and the light receiving unit 30 are assembled to the housing 15 change according to the surrounding temperature due to the temperature characteristics of the adhesive with which these units are fixed to the housing 15 and thus the position of the reflected light on the light receiving surface 32 is deviated from the normal position, the light receiving position for the reflected light on the light receiving surface 32 depending on the azimuth in which the measurement region MR is irradiated with the irradiation light IL is changed to a plurality of positions, and accordingly, the reflected light is more likely to be appropriately received. Thus, when the light receiving position for the reflected light on the light receiving surface 32 is changed according to the surrounding temperature, the distance measurement performance is less likely to be deteriorated.

According to the present embodiment, the reflected light is more likely to be received without an increase in area of the light receiving position; thus, a smaller number of pixels 31 are required to be active at a time. This can reduce power consumption of the light receiving unit 30, and disturbance light is less likely to be incident on the light receiving position. Furthermore, in the present embodiment, the light receiving position is only simply moved in the first direction, leading to an improvement in the distance measurement performance, for example, without performing complicated control such as searching for a light receiving position with the highest intensity on the basis of the intensity of the reflected light.

B. Second Embodiment

Figure 7:
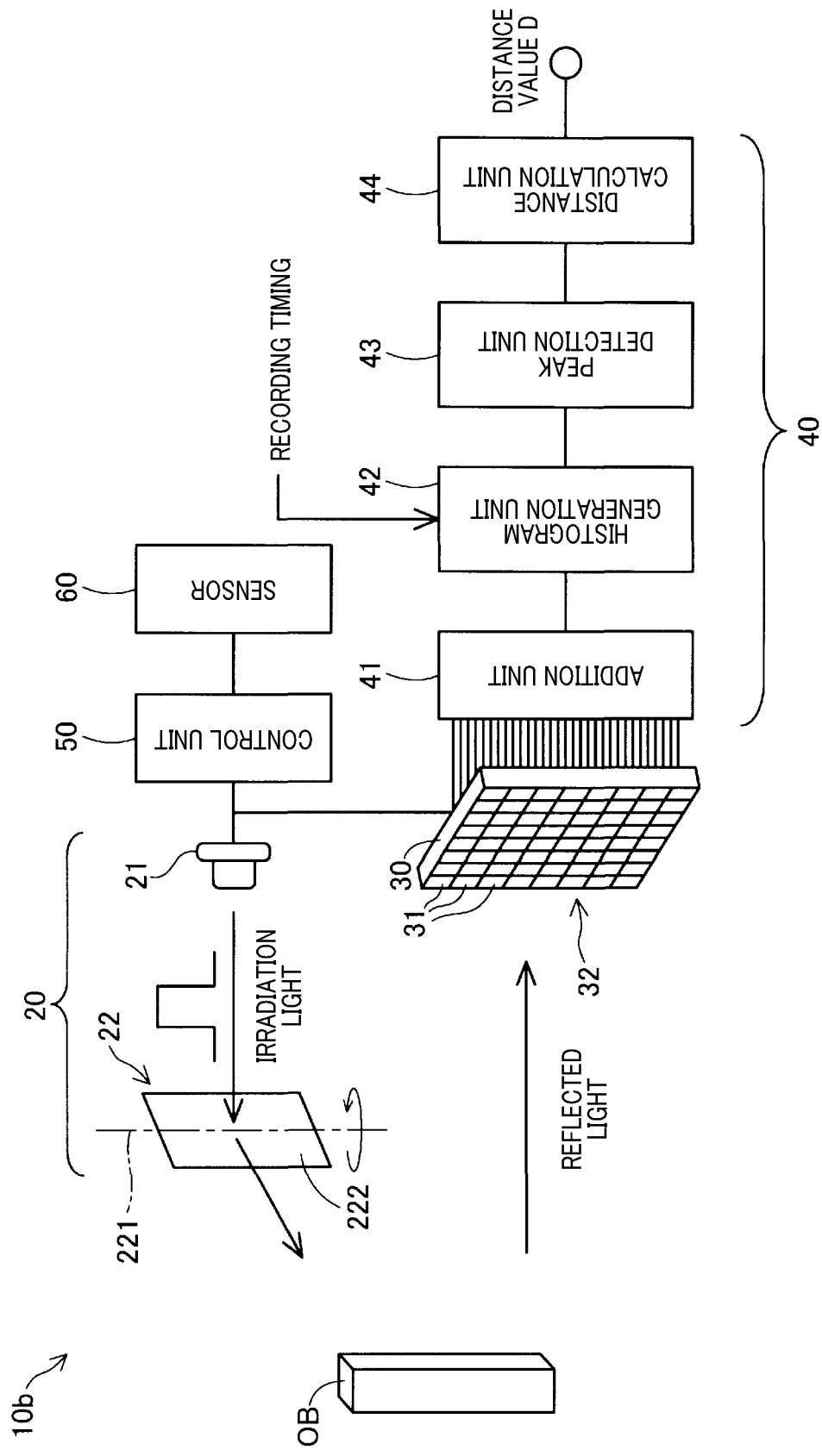
FIG. 7 is a diagram showing a configuration of an optical distance measuring device according to a second embodiment.
Figure 8:
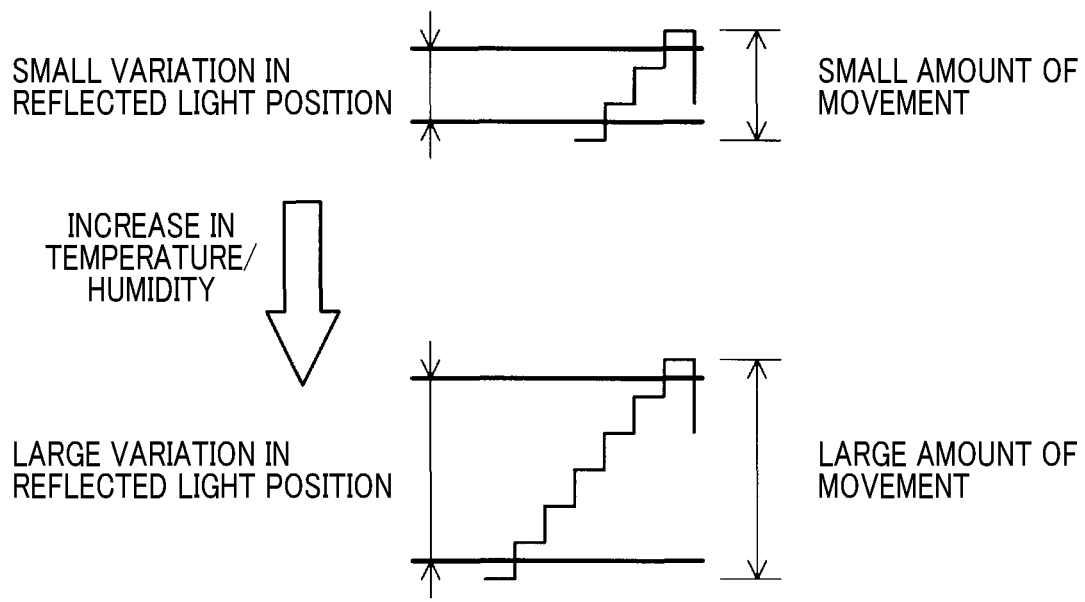
FIG. 8 is a diagram showing a change in amount of movement of the light receiving position according to temperature.

As shown in FIG. 7, an optical distance measuring device 10b of a second embodiment includes a sensor 60. The sensor 60 includes a temperature sensor and a humidity sensor. In the present embodiment, according to the temperature or humidity around the optical distance measuring device 10b that is measured by the sensor 60, the control unit 50 changes the number of positions to which the light receiving position is changed depending on the azimuth in which the irradiation light is moved. Specifically, as shown in FIG. 8, the control unit 50 sets the amount of movement of the light receiving position to be larger as the temperature is higher or the humidity is higher. Setting the amount of movement of the light receiving position to be larger indicates that the amount of movement of the light receiving position is increased by causing the light receiving position to be moved a larger distance in the first direction while the irradiation light is moved for a single azimuth on the light receiving surface 32. Thus, when the amount of movement of the light receiving position is increased, even if variation in the position irradiated with the reflected light on the light receiving surface 32 is increased, the reflected light is more likely to be appropriately received. The sensor 60 may include only one of the temperature sensor and the humidity sensor. The present embodiment is also applicable to other embodiments described later.

C. Third Embodiment

In the first embodiment, the reflected light is more likely to be received by moving the light receiving position for the reflected light back and forth as shown in FIG. 3 while the irradiation light IL is scanned in the scanning direction SD. On the other hand, in the third embodiment, the light receiving unit 30 receives the reflected light while moving the light receiving position at which the reflected light is received toward the first direction, and the light source unit 20 changes, to a plurality of azimuths, the azimuth in which the measurement region MR is irradiated with the irradiation light IL for each single light receiving position.

Figure 9:
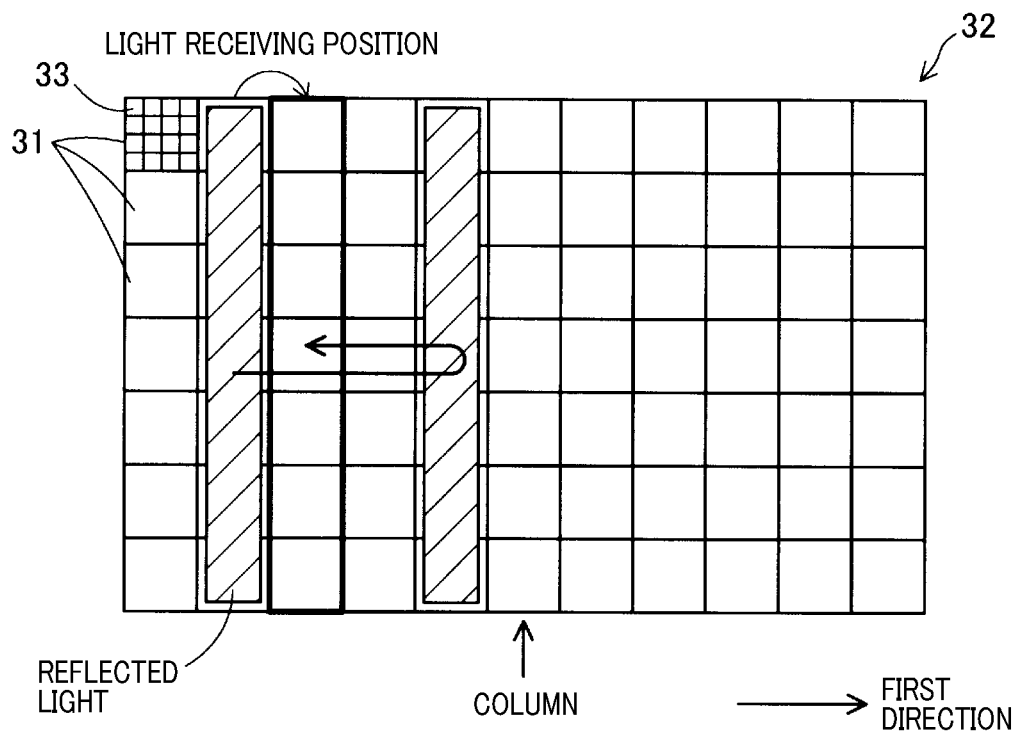
FIG. 9 is a diagram showing a relationship between the position of the reflected light and the light receiving position on the light receiving surface.
Figure 10:
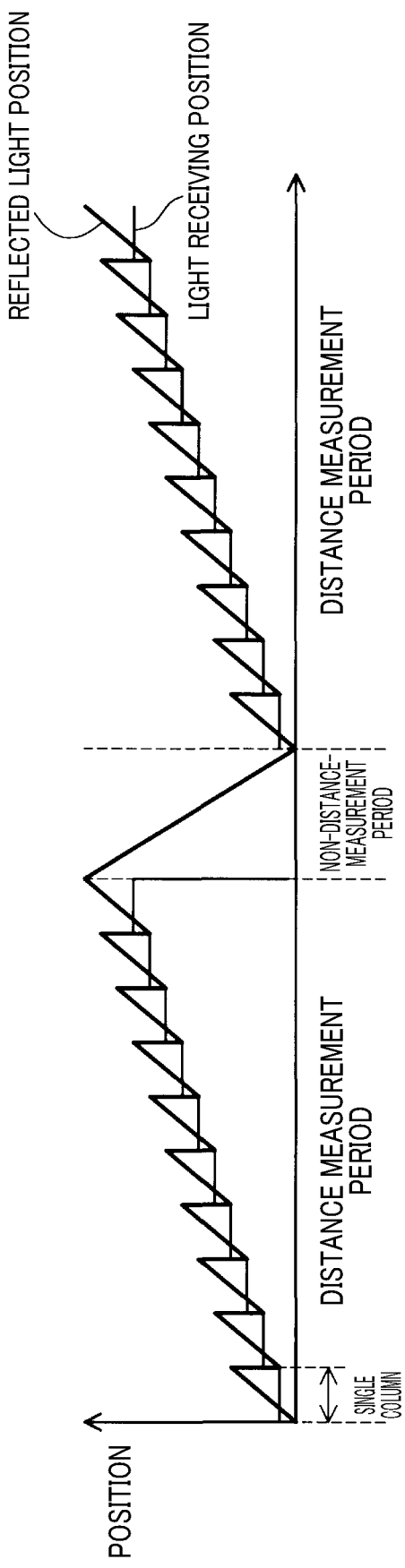
FIG. 10 is a diagram showing a relationship between the position of the reflected light and the light receiving position according to a third embodiment.
Figure 11:
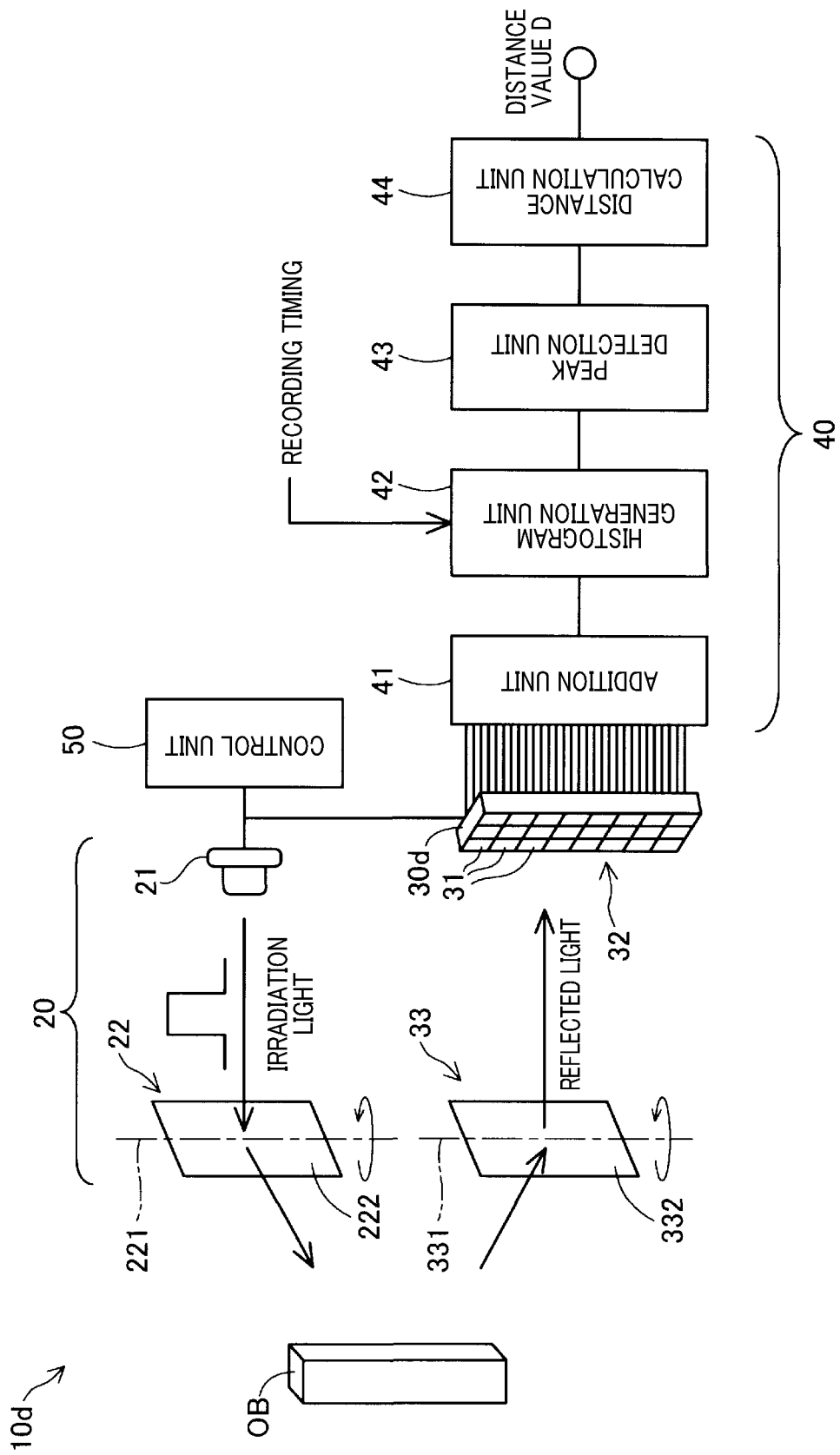
FIG. 11 is a diagram showing a configuration of an optical distance measuring device according to a fourth embodiment.

Specifically, in the present embodiment, as shown in FIG. 9, the control unit 50 controls the light receiving unit 30 to move the light receiving position by a single column of pixels in the first direction. The control unit 50 changes the azimuth in which the measurement region MR is irradiated with the irradiation light so that while the light receiving position is moved by a single column of pixels, the reflected light is moved column by column by three columns of pixels in the first direction on the light receiving surface 32 and then moved backward by two columns of pixels in the direction opposite to the first direction. Thus, as shown in FIG. 10, the reflected light is gradually moved toward the first direction while being moved back and forth on the light receiving surface 32.

In the present embodiment, the azimuth of the irradiation light IL is changed so that the reflected light is moved on the light receiving surface 32 at a speed higher than the speed at which the light receiving position is moved. Furthermore, in the present embodiment, every time reception of light at a single light receiving position is completed, the light source unit 20 changes the azimuth in which the measurement region MR is irradiated with the irradiation light IL to a direction opposite to the scanning direction SD. Then, the light source unit 20 moves the azimuth back to a position closer to the scanning direction SD side than the azimuth was before the change.

In the present embodiment, every time the light receiving position is moved by a single pixel in the first direction, the reflected light is moved by three pixels in the first direction. Thus, during distance measurement, the addition unit 41 of the measurement unit 40 adds up addition values for the number of times (three times) in which the reflected light is moved while the light receiving position is moved by a single pixel in the first direction.

According to the third embodiment described above, the azimuth in which the measurement region MR is irradiated with the irradiation light IL for each single light receiving position at which the reflected light is received is changed to the plurality of azimuths, and accordingly, the reflected light is more likely to be appropriately received. Thus, as in the first embodiment, when the light receiving position for the reflected light on the light receiving surface 32 is changed according to the surrounding temperature, the distance measurement performance is less likely to be deteriorated. Furthermore, in the present embodiment, the reflected light is more likely to be received by changing the azimuth of the irradiation light IL without increasing the width of the range irradiated with the irradiation light IL. This can prevent a reduction in SN ratio of the reflected light received by the light receiving unit 30.

Note that also in the present embodiment, as in the second embodiment, the control unit 50 may change the amount of reciprocating movement of the irradiation light according to the temperature or humidity measured by the sensor 60.

D. Fourth Embodiment

In the optical distance measuring device 10 of the first embodiment, the irradiation light emitted from the laser light source 21 is scanned by the first scanning unit 22, and the reflected light of the irradiation light is received by the light receiving unit 30. On the other hand, in an optical distance measuring device 10d of a fourth embodiment shown in FIG. 11, the irradiation light emitted from the laser light source 21 is scanned by the first scanning unit 22, and the reflected light of the irradiation light is further scanned by a second scanning unit 33 and is received by a light receiving unit 30d. The second scanning unit 33 includes a rotation axis 331 and a mirror 332 that is rotated on the rotation axis 331. The rotation of the mirror 332 is controlled by the control unit 50.

In the present embodiment, as in the first embodiment, the first scanning unit 22 changes the direction in which the measurement region MR is irradiated with the irradiation light toward the scanning direction SD (see FIG. 1). The reflected light of the irradiation light scanned in this manner is scanned by the second scanning unit 33, and an image is formed on the light receiving surface 32 by the second scanning unit 33 so that the reflected light is received at a predetermined position on the light receiving surface 32 of the light receiving unit 30d. Specifically, the second scanning unit 33 scans the reflected light reflected from the measurement region MR so that the same position on the light receiving surface 32 is irradiated with the reflected light. Thus, in the present embodiment, the reflected light is not moved on the light receiving surface 32, and accordingly, fewer columns of pixels 31 are required for the light receiving unit 30d. In the present embodiment, the light receiving surface 32 has a width of three columns of pixels.

In the present embodiment, while the direction in which the measurement region MR is irradiated with the irradiation light IL is moved for a single azimuth, the control unit 50 controls the light receiving unit 30d to move the light receiving position in a range of three columns of pixels in the first direction. Then, every time irradiation with the irradiation light IL in a single azimuth is ended, the light receiving position is moved back to the initial position. By controlling the second scanning unit 33 and the light receiving unit 30d as described above, also in the present embodiment, as in the first embodiment, the reflected light is more likely to be appropriately received.

In the present embodiment, the first scanning unit 22 and the second scanning unit 33 may be integrally formed. Specifically, the rotation axis 221 and the rotation axis 331 may have the same axis and the mirror 222 and the mirror 332 may be integrated with each other. In such an optical distance measuring device, for example, the irradiation light IL emitted from the laser light source 21 is scanned over the measurement region MR by being reflected by the rotating mirror, and the reflected light reflected from the measurement region MR is guided to the light receiving surface 32 through an optical path that is composed of the mirror and another optical component.

Figure 12:
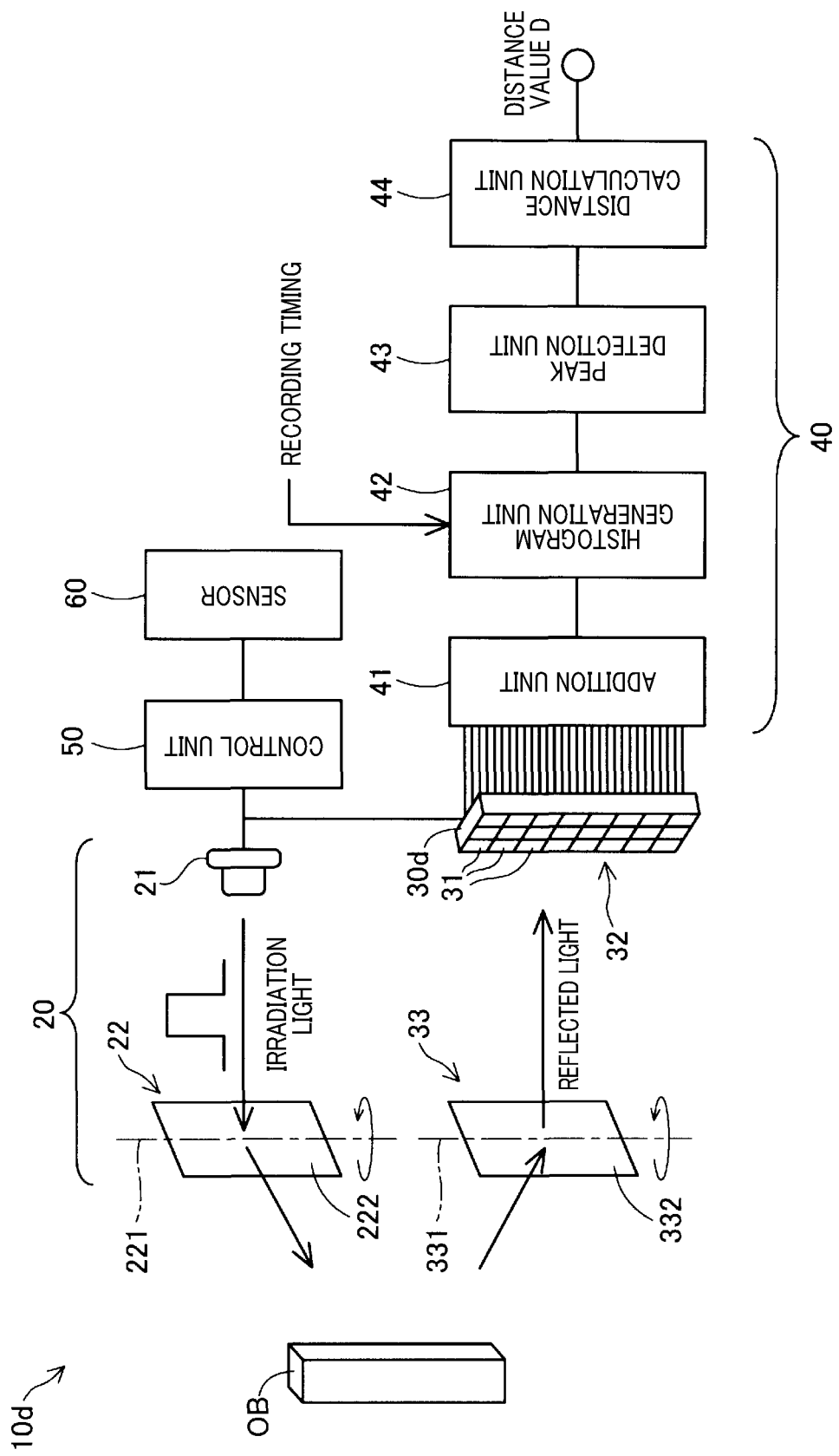
FIG. 12 is a diagram showing another configuration of the optical distance measuring device according to the fourth embodiment.
Figure 13:
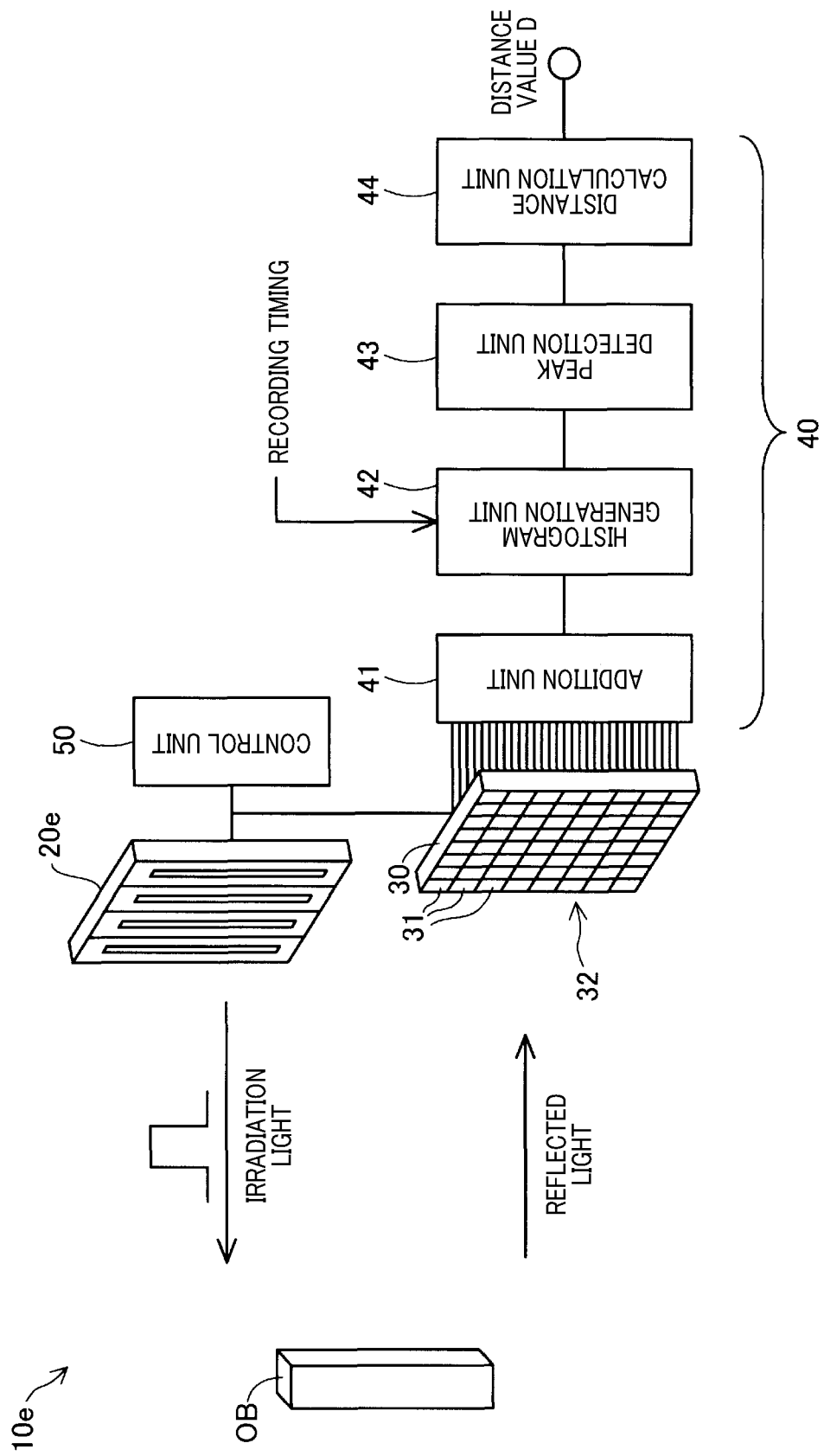
FIG. 13 is a diagram showing a configuration of an optical distance measuring device according to a fifth embodiment.

As shown in FIG. 12, as in the second embodiment, the optical distance measuring device 10d of the present embodiment may include the sensor 60. Then, the number of positions to which the light receiving position is changed depending on the azimuth in which the irradiation light IL is moved may be changed according to the temperature or humidity around the optical distance measuring device 10d that is measured by the sensor 60.

E. Fifth Embodiment

In the first embodiment, the light source unit 20 uses the first scanning unit 22 to scan the irradiation light IL in the scanning direction SD. On the other hand, in an optical distance measuring device 10e of a fifth embodiment shown in FIG. 13, a light source unit 20e is configured as a light emitting array in which vertically oriented light emitting units are coupled in the lateral direction. The control unit 50 sequentially turns on the light emitting units in the scanning direction SD to change the azimuth in which the measurement region MR is irradiated with the irradiation light. According to such a configuration, as in the first embodiment, the reflected light is more likely to be appropriately received.

F. Sixth Embodiment

In an optical distance measuring device 10f of a sixth embodiment shown in FIG. 14, as in the fifth embodiment, a light source unit 20f is configured as a light emitting array. Furthermore, as in the fourth embodiment, the reflected light is scanned by the second scanning unit 33 and is received by a light receiving unit 30f. According to such a configuration, as in the first embodiment, the reflected light is more likely to be appropriately received.

As described above, in the fourth embodiment and the sixth embodiment, the reflected light is not moved on the light receiving surface 32; thus, the direction of movement of the light receiving position in the light receiving unit 30 is not limited to the first direction. For example, the light receiving position may be moved in the direction opposite to the first direction. Alternatively, the light receiving position may be sequentially changed leftward or rightward from a center of the light receiving surface 32. Alternatively, the light receiving position may be randomly changed so that the light receiving positions are not overlapped with each other.

In the fourth embodiment and the sixth embodiment, since the reflected light is not moved on the light receiving surface 32, the size of the reflected light with respect to the light receiving surface 32 may be smaller than the light receiving surface 32 or substantially equal to the light receiving surface 32. When the light receiving surface 32 is irradiated with at least part of the reflected light, the reflected light can be appropriately received by moving the light receiving position.

G. Other Embodiments (G-1) In the above embodiments, the light receiving position in the light receiving unit 30 at which the reflected light is received has a width of a single column of pixels. However, the light receiving position may have a width of two columns of pixels or more. In this case, the light receiving unit 30 may move the light receiving position so that the light receiving positions are not overlapped with each other or may move the light receiving position so that the light receiving positions are spaced apart from each other. The light receiving unit 30 may move the light receiving position so that the light receiving positions are partially overlapped with each other or may move the light receiving position while changing the width of the light receiving position. Furthermore, the range of the light receiving surface 32 that is irradiated with the reflected light may not necessarily have a width of a single column of pixels and may have a width of two columns of pixels or more.

(G-2) In the above embodiments, the light receiving unit 30 moves the light receiving position toward the direction (first direction) in which the reflected light is moved on the light receiving surface 32. However, the light receiving unit 30 may move the light receiving position toward the direction opposite to the first direction depending on the azimuth in which the measurement region MR is irradiated with the irradiation light IL. In this case, the light receiving unit 30 may move the light receiving position at a speed lower than the speed at which the reflected light is moved on the light receiving surface 32. Furthermore, in this case, the light receiving unit 30 may move the light receiving position in the first direction every time irradiation with the irradiation light IL in a single azimuth is completed. Furthermore, in this case, the light receiving unit 30 may move the light receiving position in the first direction so that the light receiving position is moved back to a position closer to the first direction side than the light receiving position was before the movement.

(G-3) In the above embodiments, as shown in FIG. 1, the light source unit 20 scans the irradiation light IL in a single direction (scanning direction SD). However, the light source unit 20 may perform a back-and-forth scanning of the irradiation light IL in the scanning direction SD and the direction opposite to the scanning direction SD. In this case, when the reflected light is moved forward, the light receiving position is moved as in the first embodiment, and when the reflected light is moved backward, the light receiving position is moved in a direction opposite to the direction in the first embodiment. In this case, the non-distance-measurement period shown in FIG. 4 is not present, and the process of moving the light receiving position for the reflected light back to the initial position becomes unnecessary.

(G-4) In the above embodiments, the addition unit 41 of the measurement unit 40 adds up the addition values for the number of pixels by which the light receiving position is moved (in the fourth embodiment, the number of pixels by which the reflected light is moved). However, for example, the addition unit 41 may average the addition values instead of adding up the addition values. The addition unit 41 may select the largest addition value. Alternatively, the addition unit 41 may calculate an SN ratio of each addition value and add up, average, or select only the addition values with an SN ratio of a specified value or more. The addition unit 41 may add up, average, or select only the addition values with higher SN ratios.

(G-5) The above embodiments show an example in which the irradiation light IL and the light receiving position are scanned in a single direction. However, the scanning method is not limited to the one-dimensional scanning. For example, the irradiation light may be scanned in two directions which are the lateral direction and the longitudinal direction, and the irradiation light may be moved in two directions which are the lateral direction and the longitudinal direction on the light receiving surface 32. In this case, the control unit 50 moves the light receiving position according to the direction of the movement of the reflected light. Even in this case, by moving the light receiving position or the azimuth of the irradiation light back and forth, as in the above embodiments, the reflected light is more likely to be received.

(G-6) In the above embodiments, the pixel 31 of the light receiving unit 30 is composed of a SPAD. However, the pixel 31 may be composed of alight receiving device other than the SPAD, such as a pin photodiode or an avalanche photodiode. In this case, when the light receiving device can output a signal at a level corresponding to the intensity of the received reflected light, the distance can be measured by using the level of the signal without forming a histogram.

(G-7) The optical distance measuring device as an embodiment of the present invention only needs to be able to change a light receiving position for reflected light from an object to a plurality of positions, and it is not essential for the optical distance measuring device to change an azimuth of the irradiation light.

The present disclosure is not limited to the embodiments described above, and can be implemented in various configurations without departing from the scope of the present disclosure. For example, in order to solve some or all of the problems described above or to achieve some or all of the effects described above, replacement or combination may be performed as appropriate in the technical features in the embodiments. Unless the technical features are described as essential in the present specification, the technical features may be omitted as appropriate.

What is claimed is:

1. An optical distance measuring device comprising:
   a light source unit configured to irradiate a measurement region with irradiation light;
   a light receiving unit comprising a light receiving surface including a plurality of light receiving elements configured to receive reflected light from a range including the measurement region corresponding to irradiation with the irradiation light and outputs a signal corresponding to a light receiving state of the reflected light for each of the plurality of light receiving elements;
   a scanning unit positioned between the measurement region and the light receiving unit, the scanning unit configured to receive the reflected light from the range including the measurement region and reflect the reflected light to predetermined positions on the light receiving surface; and
   a measurement unit configured to measure a distance to an object in the measurement region by using the signal outputted from the light receiving unit, wherein
   the light receiving unit has a function of selecting a light receiving element of the plurality of light receiving elements that outputs the signal so that a light receiving position at which the reflected light is received is variable, and the light receiving unit changes the light receiving position to a plurality of positions with respect to a position of the reflected light,
   the light receiving unit changes the light receiving position to a plurality of positions by moving the light receiving position toward a predetermined first direction, and
   every time a light receiving process for irradiation with the irradiation light in a single azimuth is completed, the light receiving unit moves the light receiving position in a direction opposite to the first direction.

2. An optical distance measuring device comprising:
   a light source unit configured to irradiate a measurement region with irradiation light;
   a light receiving unit comprising a light receiving surface including a plurality of light receiving elements configured to receive reflected light from a range including the measurement region corresponding to irradiation with the irradiation light and outputs a signal corresponding to a light receiving state of the reflected light for each of the plurality of light receiving elements;
   a scanning unit positioned between the measurement region and the light receiving unit, the scanning unit configured to receive the reflected light from the range including the measurement region and reflect the reflected light to predetermined positions on the light receiving surface; and
   a measurement unit configured to measure a distance to an object in the measurement region by using the signal outputted from the light receiving unit, wherein
   the light receiving unit has a function of selecting a light receiving element of the plurality of light receiving elements that outputs the signal so that a light receiving position at which the reflected light is received is variable, and the light receiving unit changes the light receiving position to a plurality of positions with respect to a position of the reflected light,
   each of the plurality of light receiving elements include a SPAD (single photon avalanche diode) that outputs, as the signal, an output signal indicating incidence of light, and
   the measurement unit counts, for each of the plurality of light receiving elements, the number of output signals outputted substantially at the same time from a plurality of the SPADs, records the counted number of output signals for each time of flight after irradiation with the irradiation light to obtain a histogram for each of the plurality of light receiving elements, and measures the distance for each of the plurality of light receiving elements on the basis of the histogram.

3. The optical distance measuring device according to claim 2, wherein
   a size of the reflected light on the light receiving surface is smaller than a size of the light receiving surface.

4. The optical distance measuring device according to claim 2, wherein
   the light source unit irradiates the measurement region with the irradiation light while changing an irradiation azimuth among a plurality of azimuths so that the irradiation azimuth is moved toward a predetermined second direction.

5. The optical distance measuring device according to claim 2, wherein
   after distance measurement for the plurality of azimuths is completed by the measurement unit, during a period in which the distance measurement is not performed, the light receiving unit moves the light receiving position back to an initial position.

6. The optical distance measuring device according to claim 2, further comprising a sensor that measures temperature or humidity, wherein
   according to the temperature or humidity measured by the sensor, the light receiving unit changes the number of positions to which the light receiving position is changed depending on the azimuth.

7. The optical distance measuring device according to claim 2, wherein each of the plurality of light receiving elements include a SPAD (single photon avalanche diode) that outputs, as the signal, an output signal indicating incidence of light.

8. The optical distance measuring device according to claim 7, wherein the measurement unit counts, for each of the plurality of light receiving elements, the number of output signals outputted substantially at the same time from a plurality of the SPADs, records the counted number of output signals for each time of flight after irradiation with the irradiation light to obtain a histogram for each of the plurality of light receiving elements, and measures the distance for each of the plurality of light receiving elements on the basis of the histogram.

9. The optical distance measuring device according to claim 2, wherein the light receiving unit changes the light receiving position to a plurality of positions by moving the light receiving position toward a predetermined first direction.

10. The optical distance measuring device according to claim 9, wherein the light receiving unit moves the light receiving position at a speed higher than a speed at which the reflected light is moved on the light receiving surface.

11. The optical distance measuring device according to claim 10, wherein every time a light receiving process for irradiation with the irradiation light in a single azimuth is completed, the light receiving unit moves the light receiving position in a direction opposite to the first direction.

12. The optical distance measuring device according to claim 11, wherein the light receiving unit moves the light receiving position in the direction opposite to the first direction to move the light receiving position back to a position closer to a first direction side than the light receiving position was when irradiation with the irradiation light in the previous azimuth is started.

* * * * *